United States Patent
Campbell

(10) Patent No.: US 7,278,771 B2
(45) Date of Patent: Oct. 9, 2007

(54) OPTICAL FILM

(75) Inventor: Alan B. Campbell, Santa Rosa, CA (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 10/994,571

(22) Filed: Nov. 22, 2004

(65) Prior Publication Data
US 2006/0109687 A1 May 25, 2006

(51) Int. Cl.
*F21V 7/04* (2006.01)

(52) U.S. Cl. .............. 362/606; 362/607; 362/620; 362/626; 359/837

(58) Field of Classification Search ............. 362/26, 362/606, 607, 620, 626; 359/837; 349/64
See application file for complete search history.

(56) References Cited

U.S. PATENT DOCUMENTS

| | | | |
|---|---|---|---|
| 3,754,813 A | 8/1973 | De Palma et al. | |
| 3,765,281 A | 10/1973 | Wolfe et al. | |
| 3,788,171 A | 1/1974 | Hoadley et al. | |
| 3,851,093 A | 11/1974 | Sustein | |
| RE29,091 E | 12/1976 | De Palma et al. | |
| 4,542,449 A | 9/1985 | Whitehead | |
| 4,791,540 A | 12/1988 | Dreyer, Jr. et al. | |
| 4,804,253 A | 2/1989 | Stewart | |
| 4,906,070 A | 3/1990 | Cobb, Jr. | |
| 4,984,144 A | 1/1991 | Cobb, Jr. et al. | |
| 5,005,108 A | 4/1991 | Pristash et al. | |
| 5,076,668 A | 12/1991 | Dalisa et al. | |
| 5,128,783 A | 7/1992 | Abileah et al. | |
| 5,161,041 A | 11/1992 | Abileah et al. | |
| 5,190,370 A | 3/1993 | Miller et al. | |
| 5,280,371 A | 1/1994 | McCartney, Jr. et al. | |
| 5,394,255 A | 2/1995 | Yokota et al. | |
| 5,467,208 A | 11/1995 | Kokawa et al. | |
| 5,467,417 A | 11/1995 | Nakamura et al. | |
| 5,521,797 A | 5/1996 | Kashima et al. | |
| 5,550,657 A | 8/1996 | Tanaka et al. | |
| 5,552,907 A | 9/1996 | Yokata et al. | |
| 5,592,332 A | 1/1997 | Nishio et al. | |
| 5,596,429 A | 1/1997 | Kokawa et al. | |
| 5,598,280 A | 1/1997 | Nishio et al. | |
| 5,600,455 A | 2/1997 | Ishikawa et al. | |
| 5,627,926 A | 5/1997 | Nakamura et al. | |
| 5,771,328 A | 6/1998 | Wortman | |
| 5,919,551 A | 7/1999 | Cobb | |
| 6,052,164 A | 4/2000 | Cobb | |
| 6,322,236 B1 | 11/2001 | Campbell et al. | |
| 6,354,709 B1 * | 3/2002 | Campbell et al. | 362/627 |
| 2003/0035231 A1 | 2/2003 | Epstein | |
| 2003/0214728 A1 | 11/2003 | Olczak | |
| 2004/0109663 A1 | 6/2004 | Olczak | |

(Continued)

FOREIGN PATENT DOCUMENTS

DE 3407 431 A1 2/1984

(Continued)

Primary Examiner—Stephen F. Husar
Assistant Examiner—Meghan K. Dunwiddie

(57) ABSTRACT

A film for use with a backlit display has prismatic structure on one surface. The structures have a serpentine shape. The average periods and amplitudes of the serpentine shapes may be optimized to minimize moiré interference with the pixels of the display.

5 Claims, 6 Drawing Sheets

U.S. PATENT DOCUMENTS

2004/0120136 A1    6/2004    Olczak
2005/0270798 A1*   12/2005   Lee et al. .................. 362/607

FOREIGN PATENT DOCUMENTS

| | | |
|---|---|---|
| EP | 0 531 939 A1 | 3/1993 |
| JP | 6-18707 | 1/1994 |
| JP | 2003337331 | 11/2003 |
| JP | 2005123046 | 12/2005 |
| KR | 2003089912 | 11/2003 |
| WO | WO96/27757 | 9/1996 |
| WO | WO97/28468 | 8/1997 |

* cited by examiner

OPTICAL FILM

BACKGROUND OF THE INVENTION

Electronic displays often use a light gating device such as a liquid crystal display (LCD) in front of a backlight. Backlights may be as simple as a lighting element such as a fluorescent tube behind the light gating device or may be more complicated arrangements. A common arrangement is to use a lighting element such as a cold cathode fluorescent tube (CCFT) or one or more light emitting diodes (LED's) placed adjacent an edge light guide lying behind the light gating device. The light guide conducts and distributes the light over the entire light gating device.

Various types of optical films maybe positioned between the light source or light guide and the light gating device. Examples include prismatic films with the prisms directed away from the light source, prismatic films with the prisms directed toward the light source, diffusing films, and reflective polarizers. The prismatic films with the prisms on the side of the film directed toward the light gating device improve the on axis brightness of the display by causing light from the backlight to be restricted to a narrower range of angles than it would be absent the film. The prism films with the prisms facing toward the backlight are used with a special class of light guides that emit light at a large angle, typically over 70°, to the normal. These prism films are used to turn the light towards the normal. The diffusers and reflective polarizers do just what their names imply.

One known problem when using prismatic films with a light gate having a rectangular array of pixels is moiré interference that arises because of the interaction of the regular pattern of linear prisms with the rows and columns of pixels in the light gating device. Various attempts have been made to avoid this problem by arranging the prismatic films such that the prisms run at an angle other than zero or 90° with the rows and columns of pixels or by choosing a prism size such that the moiré interference has a spatial frequency sufficiently different than that of the display.

DETAILED DESCRIPTION

Figure 1:
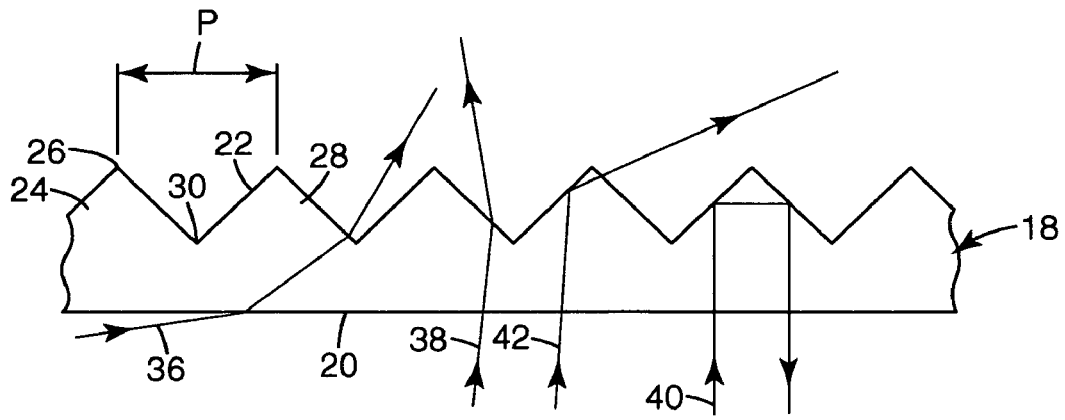
FIG. 1 is a film for enhancing the apparent brightness of a display.

The present invention will be described in the context of a liquid crystal display although those of skill in the art will recognize that it would work with any display capable of selectively blocking or transmitting light. Such displays are known as light gating devices. FIG. 1 shows a film 18 intended to increase the on axis brightness of a display. Film 18 has a first surface 20 and a second surface 22. Second surface 22 includes a plurality of structures. Generally these structures are triangular prisms such as prism 24 although other shapes may be used. Prism 24 has a peak 26. Experience has shown that the gain (i.e. the ratio of the on axis brightness of a backlight with the film to the on axis brightness of the same backlight without the film) will be greatest if peak 26 is a sharp corner and forms an angle of 90°, although other considerations may cause a user to choose a rounded corner or other angles. Between prism 24 and adjacent prism 28 is a valley 30. As with peak 26, film 18 will have the highest gain if valley 30 is sharp and forms an angle of 90° although valley 30 could be rounded or form other angles.

The prisms have a peak to peak separation known as the pitch, P, of film 18. Generally the pitch should be small enough that the prisms will not be visible to a user viewing a display including film 18, but not so small that diffractive effects reduce performance. Commercial products have generally had pitches between about 24 μm and 50 μm.

Typically first surface 20 will be a smooth surface. In this context, a smooth surface will be understood to mean that any structures on surface 20 are small in comparison to the size of the prisms such as prism 24 on side 22 of film 18. Commonly surface 20 will be a matte surface in order to help hide any structure of the backlight behind film 18. Alternatively, side 20 might have other structures such as a moth eye structure for reducing fresnel reflections from surface 20.

FIG. 1 shows four exemplary light rays. The first, light ray 36, approaches surface 20 at a grazing angle, i.e. an angle to the normal approaching 90°. Light ray 36 will be refracted towards the normal to film 18 as it passes through surface 20. Upon reaching structured surface 22, it will be refracted again. Because of the structures on structured surface 22 it will be refracted so that again it will make a smaller angle to the normal to film 18. Light ray 38 approaches smooth surface 20 at an angle much closer to the normal to film 18. It is also refracted as it passes through surface 20, but to a lesser extent. Upon exiting through surface 22, it is refracted again so that it is on the opposite side of the normal to film 18 that it was on upon first striking surface 20. Light ray 40 approaches at an angle close to or at the normal to film 18 and is totally internally reflected twice by structured surface 22 in return toward the backlight. Light ray 42 approaches surface at an angle similar to that of light ray 38 but in a location such that it is totally internally reflected by one side of a prism on structured surface 22 but not by the second side. As a result it emerges at a large angle to the normal to film 18. Because such a reflection only occurs to a light ray that is traveling in direction that forms a high incidence angle to the side it strikes, the prisms provide a very small cross section to such rays. In addition, many of those rays will re-enter the next prism and be returned into the display.

As may be seen from this discussion, light that, absent film 18, would have emerged from the display at a high angle to the axis of the display is redirected into a direction closer to that axis. A small amount of light will be directed out at a large angle to the axis. Thus, we may say that light that enters film 18 through surface 20 with an angle of incidence greater than a predetermined angle is directed into a narrower range of angles than the range of angles through which it entered. Light that enters film 18 through smooth surface 20 at an angle of incidence less than that predetermined angle will be reflected back towards the backlight.

The light that is reflected back towards the backlight will be diffused and reflected back towards film 18. In general, it will make a different angle than it made the first time. The process is then repeated so that more of the light is redirected into the narrower range of angles. The key aspect of the operation of film 18 is that film 18 must be capable of reflecting light striking it in a first predetermined range of angles and passing but refracting light striking it in a second predetermined range of angles wherein the angles in the second range of angles are greater than those in the first range of angles and wherein the light in the second range of angles is refracted into a narrower range of angles than those through which they entered.

Figure 2:
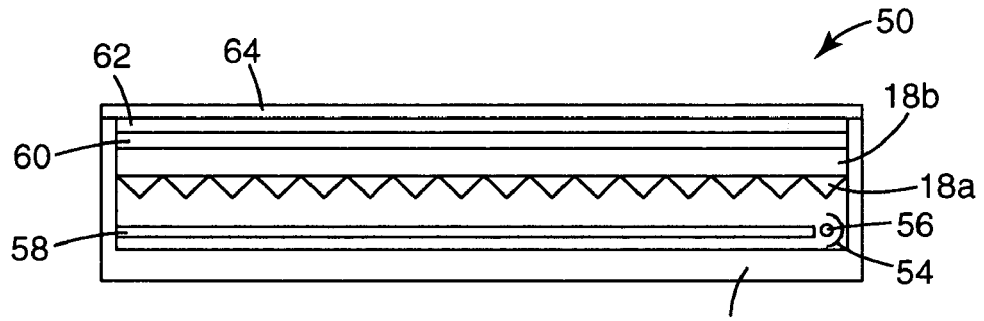
FIG. 2 is a display utilizing the film of FIG. 1.

FIG. 2 is a typical display utilizing two films as shown in FIG. 1. Although a single film could be used, most LCD displays use two of such films.

Display 50 includes a case 52 which encloses the display. Inside case 52 is a light source 54. Typically light source 54 is a cold cathode fluorescent tube. Partially surrounding light source 54 is a reflector 56. Reflector 56 could be any highly reflective material. An example of a material which could be used as reflector 56 is a multi-layer optical film as described in U.S. Pat. No. 5,882,774. Optically coupled to light source 54 is a light guide 58. Light guide 58 could be acrylic or any other highly transparent material. Typically, light guide 58 has a pattern of dots screen printed on the side away from the liquid crystal in order to help extract light to illuminate the LCD. Light extracted from light guide 58 passes through films 18a and 18b. Film 18b has structures similar to those on 18a, but they cannot be seen in the view of FIG. 2 because they run perpendicular to those of 18a. The effect of using two films of the type of film 18 of FIG. 1 is that the gain is increased by moving light that would emerge from the display at high angles in both the horizontal and vertical dimensions to angles closer to the access of the display.

After emerging from film 18b, light passes through a diffuser 60. Diffuser 60 helps to hide both the prisms and the dots printed on light guide 58 from the user. After diffuser 60 the light passes through liquid crystal display 62 and protective cover sheet 64.

Figure 3:
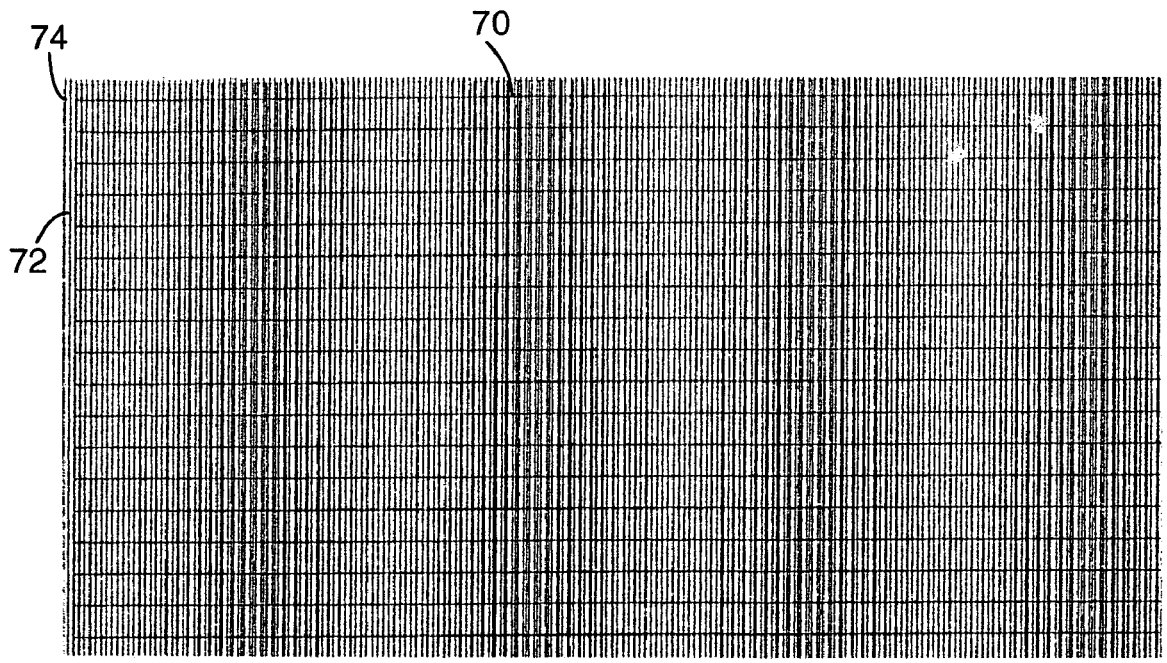
FIG. 3 is a schematic demonstration of the moiré performance of the prior art.

In the prior art, the prisms of film 18 were typically linear prisms. A problem with linear prisms is that they tend to produce moiré interference with the linear rows and columns of pixels in the LCD display. FIG. 3 illustrates this. In FIG. 3 an array of horizontal lines such as horizontal line 70 and vertical lines such as vertical line 72 that represent the pixel array in a typical LCD display. Each pixel is square and consists of three horizontally aligned sub-pixels, one each for red, green and blue. Therefore, the pixel array has three times as many vertical lines as horizontal lines. Overlaid on this pixel array is a series of vertical lines such as line 74 representing a film such as film 18 having linear presence. The lines such as line 74 represent the peaks of the prisms. When viewed from a distance of approximately 6 meters, FIG. 1 will have the visual effect of viewing a typical LCD display with a film such as film 18 which linear prisms from a distance of about 45 centimeters, a typical viewing distance for a person using a computer with an LCD display. When FIG. 3 is viewed from this distance the light and dark bands of the moire interference are clearly visible.

Figure 4:
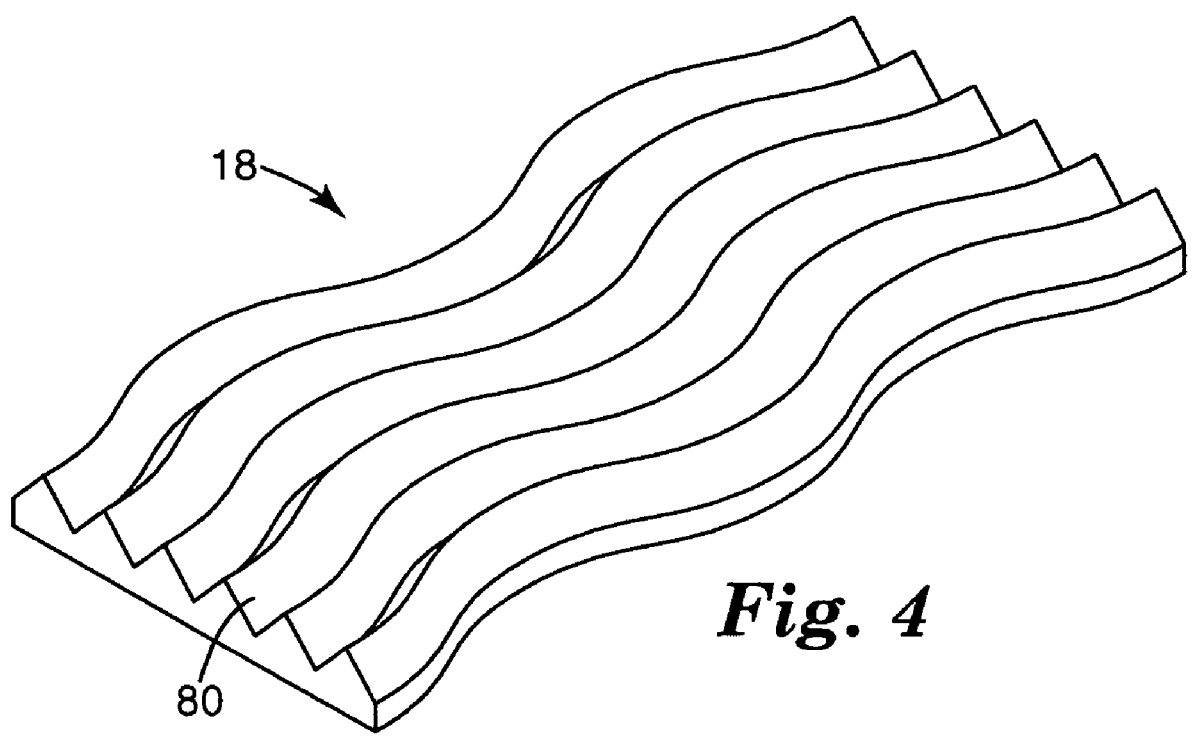
FIG. 4 is a drawing of a film according to the invention.
Figure 5A:
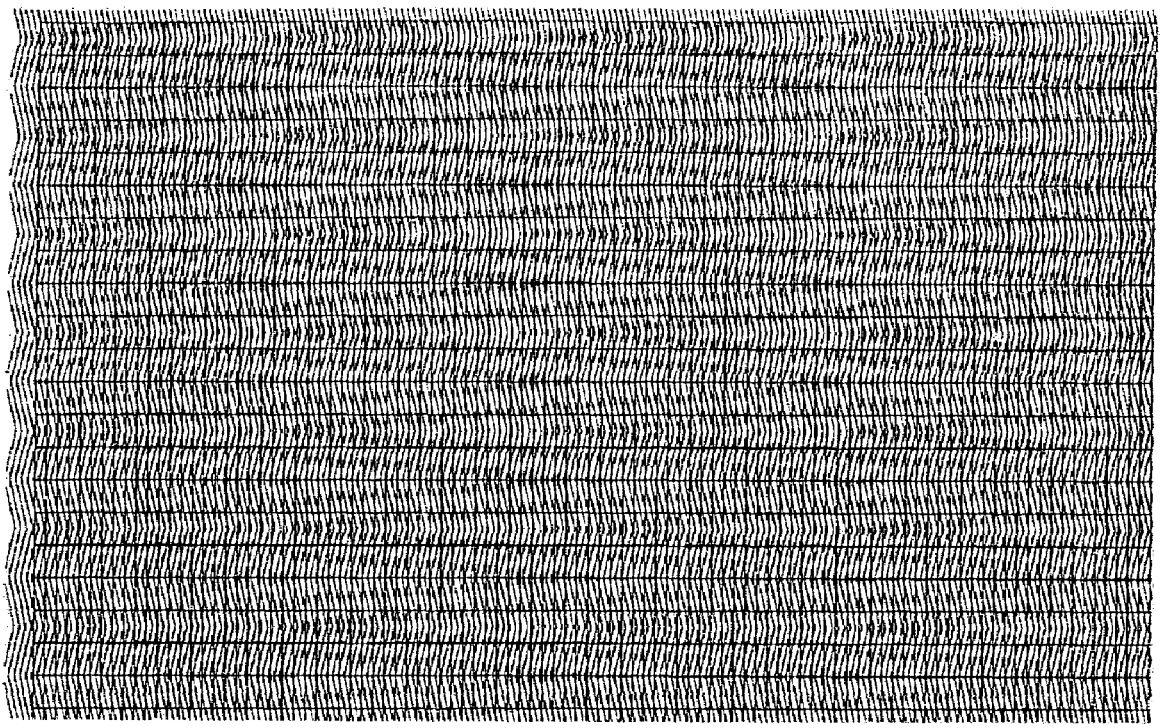
FIG. 5A through 5F are schematic demonstrations of the moiré performance of various films according to the invention.
Figure 5B:
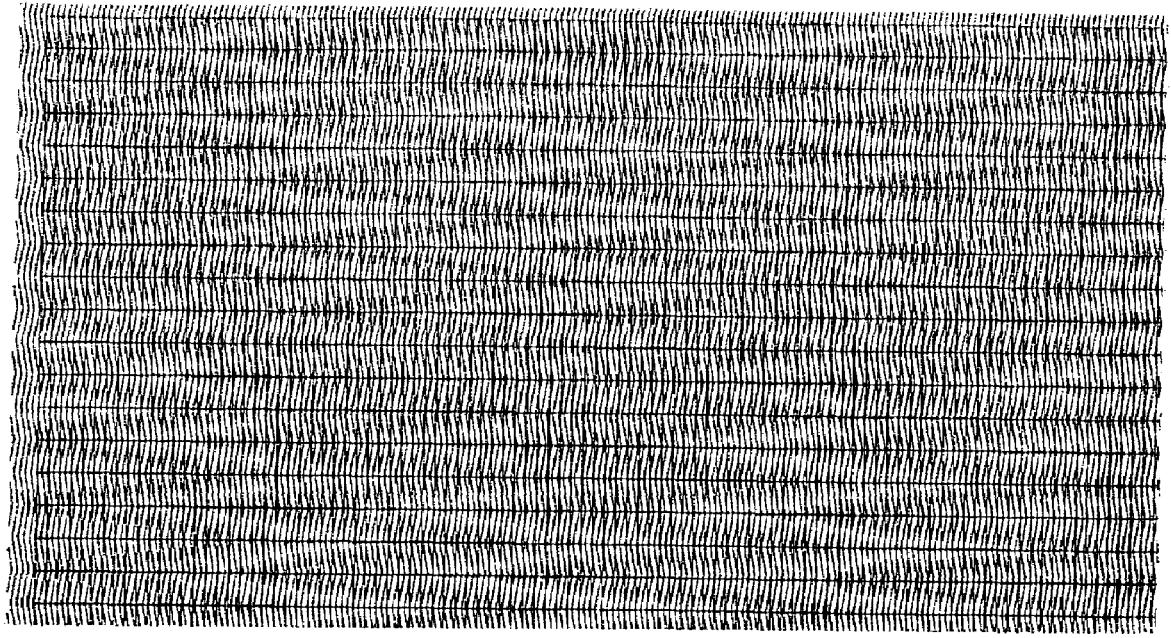
Figure 5C:
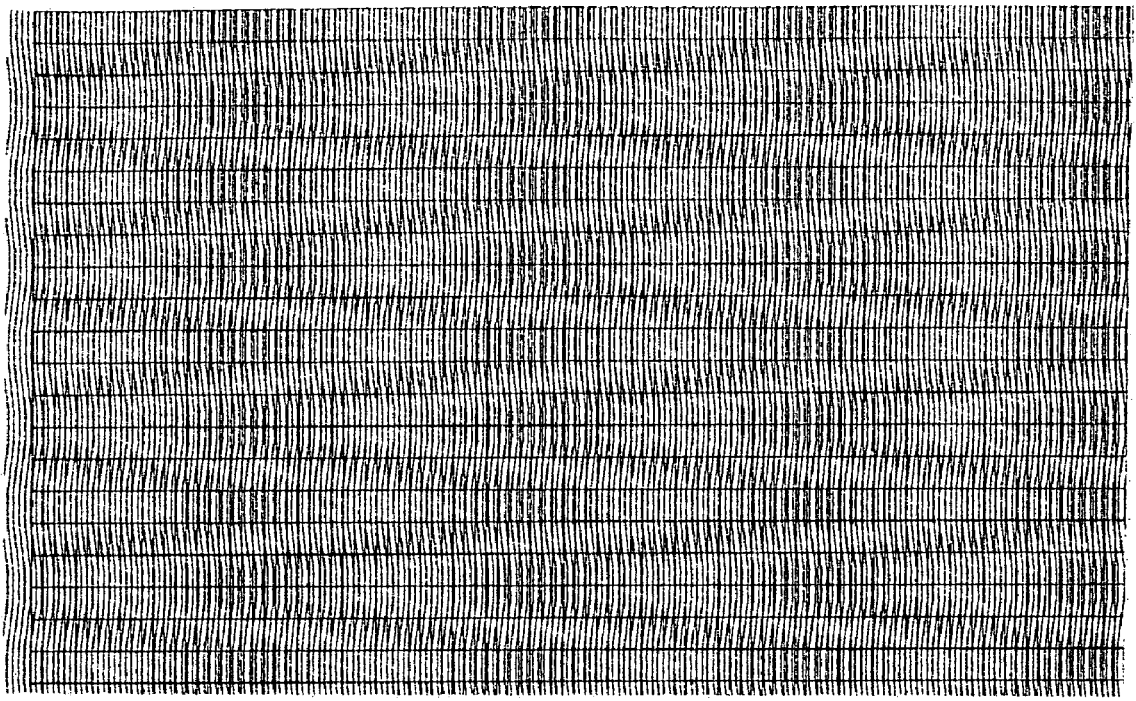
Figure 5D:
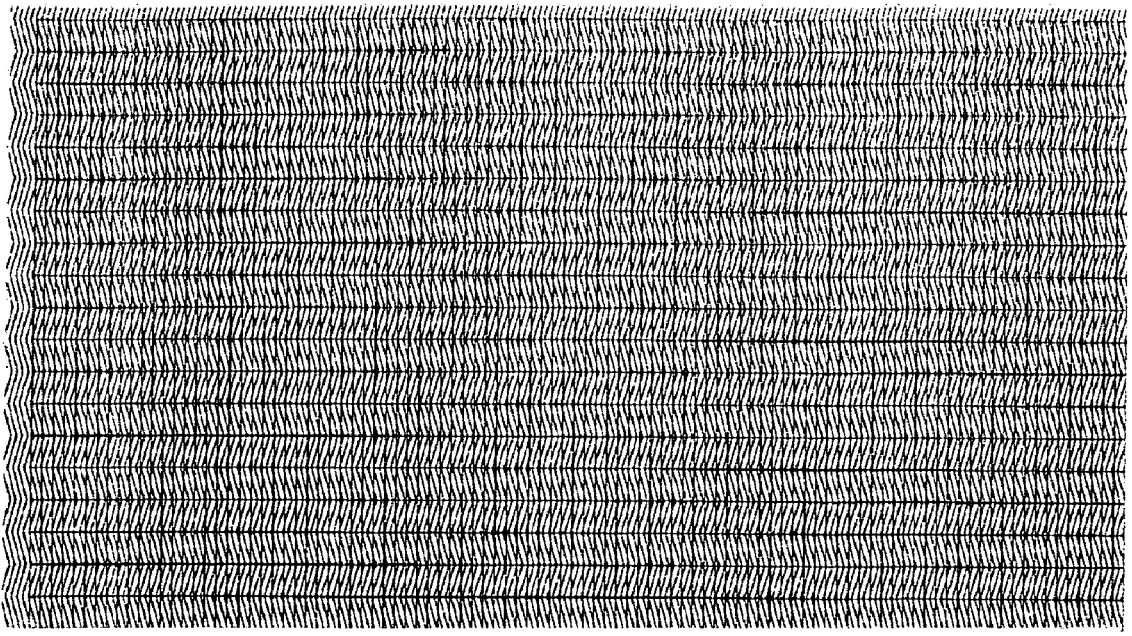
Figure 5E:
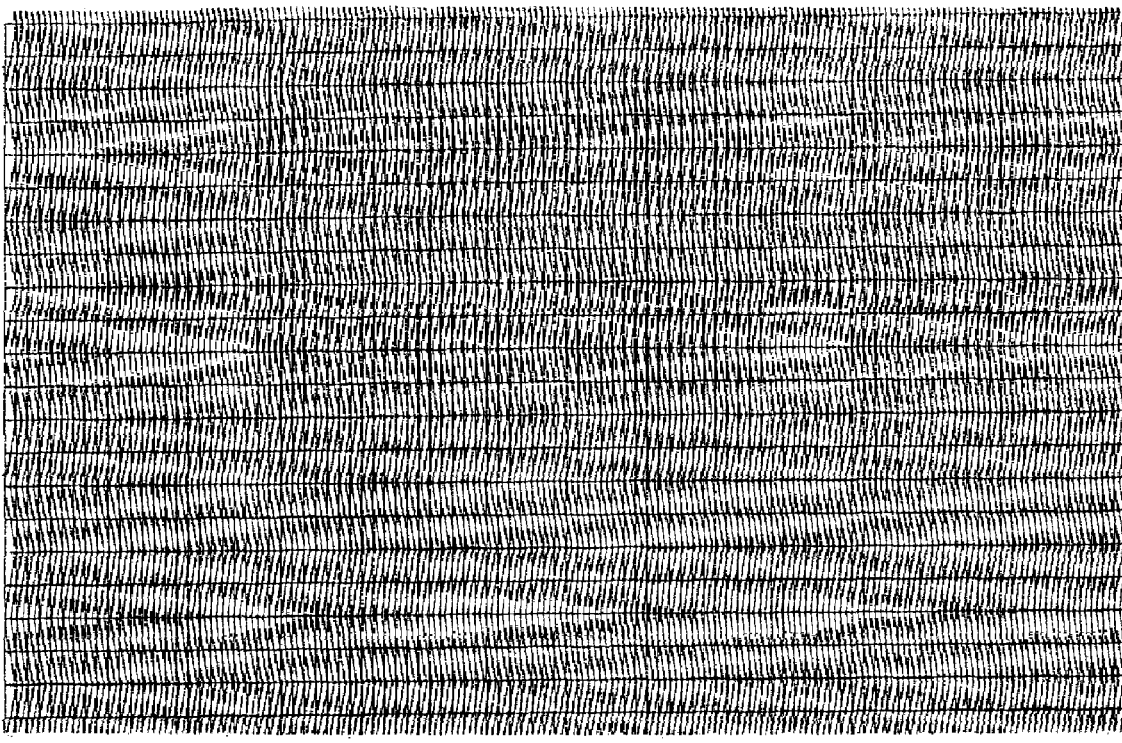
Figure 5F:
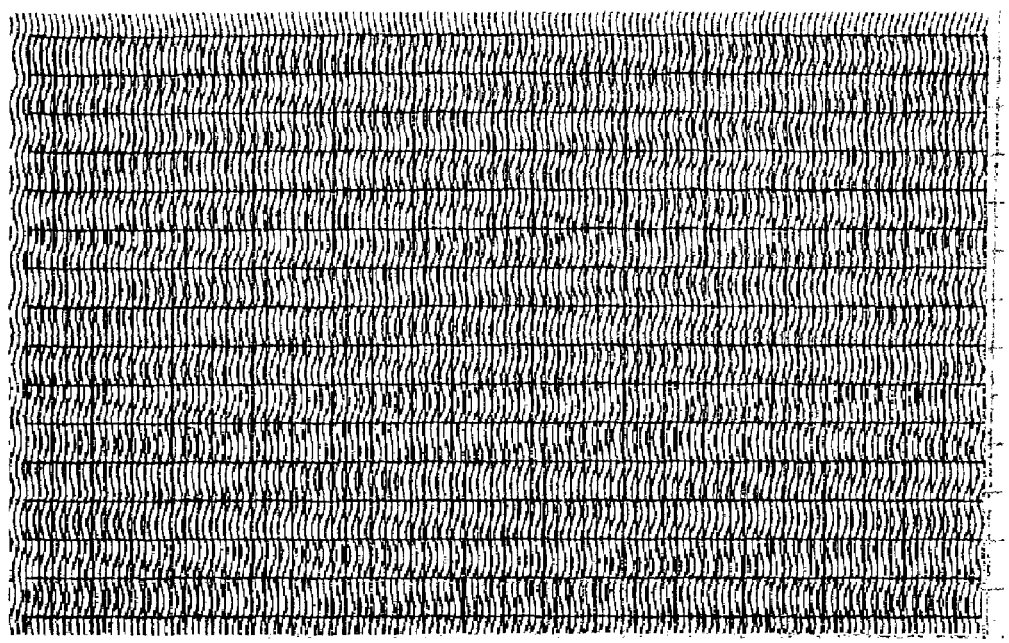

FIG. 4 illustrates an alternative version of film 18. Film 18 of FIG. 4 includes prisms such as prism 80 that are curved or serpentine. The serpentine pattern could be random or regular and periodic as shown. Regular and periodic curves will generally have less effect in reducing the gain of film 18.

FIGS. 5A to 5F are illustrations similar to FIG. 3 except that the lines representing prism peaks are serpentine rather than linear. When viewed from a distance of 6 meters most of these exhibit no discernible moiré pattern. Even when a moiré pattern is visible it is reduced in comparison to that produced by linear prisms.

Figure 6:
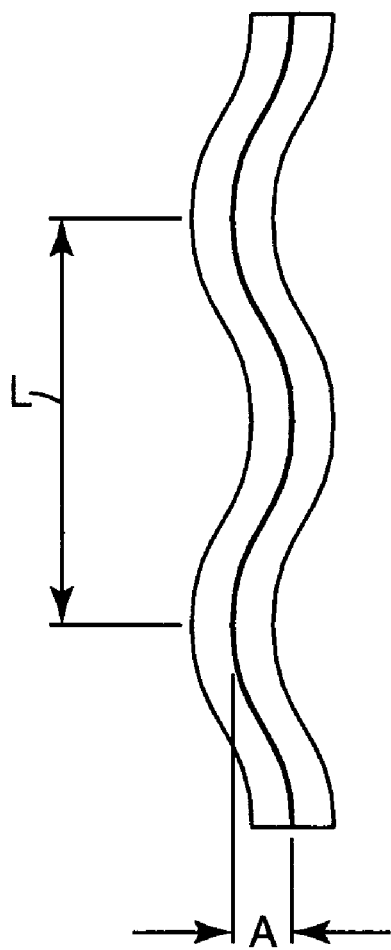
FIG. 6 is a drawing of a single prism of a film according to the invention.
Figure 7:
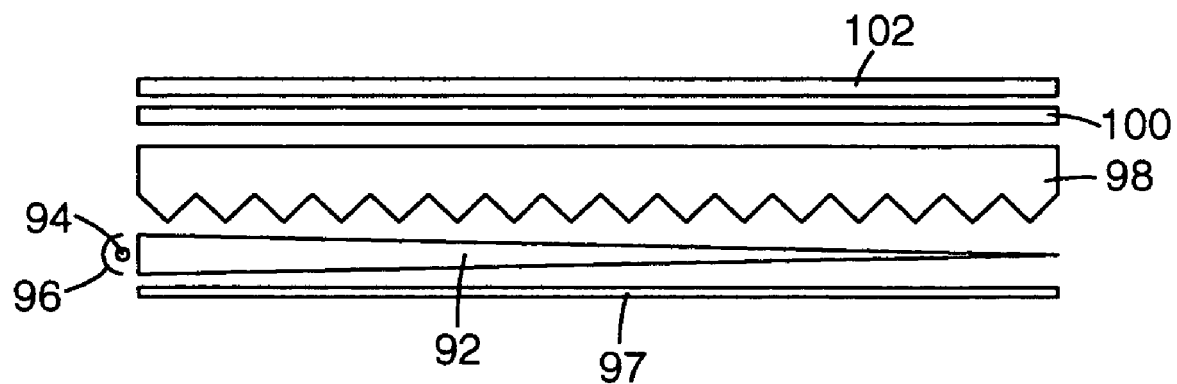
FIG. 7 is a schematic drawing an alternative display according to the invention.

FIG. 6 is a top view of a single prism of film 18 of FIG. 5. Regardless of whether the serpentine pattern is random or regular and periodic. The serpentine curves will have an average amplitude A and an average period L. When the pattern is regular and periodic, the average amplitude and average period will simply be equal to the actual amplitude and period. The average amplitude and average period should be appropriately chosen to minimize visible moiré interference. Generally the amplitude should be greater than about one-quarter of the sub-pixel size and the amplitude should be at least about equal to the pixel size and the ratio of the period to the amplitude should not be too great. Experiments have shown that ratio of the period to the amplitude up to 12 to 1 can be effective at limiting visible moiré interference, however, larger ratios may work to eliminate visible moiré. Even if visible moiré is not totally eliminated, serpentine prisms tend to reduce it. As a result prisms having a serpentine pattern but not meeting the amplitude and period limitations above are still useful. μm FIG. 7 is a schematic view of an alternative display designated generally as 90. Display 90 includes a light guide 92 that receives light from a CCFT 94. Reflector 96 collects light from CCFT 94 and directs it into light guide 92.

Light guide 92 is tapered or wedge shaped. As light is conducted along light guide 92, the angle it makes with the surfaces of light guide 92 will change with each reflection due to the tapered shape of light guide 92. Eventually the light will strike one of the surfaces of light guide 92 at an angle less than the critical angle for total internal reflection and will be emitted. A reflector 97 is provided to reflect light that is emitted from the back side of light guide 92. The light that is emitted from light guide 92, will be emitted at a very large angle to the normal to the surface of light guide 92. Prism film 98 captures that light and redirects it by total internal reflection from the facets of the prism so that it is traveling along the axis of the display. A diffuser 100 and a liquid crystal panel 102 are also provided.

As with the display of FIG. 2, the prism of film 98 can create moiré interference with the pixel array of liquid crystal panel 102. By providing a serpentine pattern to those prisms, the moire interference can be reduced or eliminated. The same considerations apply for choosing amplitude and pitch of the serpentine pattern as apply to the display of FIG. 2.

Films according to the present invention could be made of any transparent polymer material such as polycarbonate or an acrylic. Films used in displays such as the one depicted in FIG. 2 generally should have a high index of refraction. An index of 1.72 is generally considered optimum although commercial products typically have an index around 1.585. Films for use in displays of the type depicted in FIG. 7 generally have a lower index. Films according to the invention could be manufactured by any known method such as extrusion or cast and cure of a U-V curable resin.

Masters for the tools used for manufacturing films according to the invention, whether by extrusion or by a cast and cure process, may be made by known diamond turning techniques. Typically the tools are made by diamond turning on a cylindrical blank known as a roll. The surface of the roll is typically of hard copper, although other materials may be used. The prism structures are formed in continuous patterns around the circumference of the roll. In a preferred embodiment the grooves are produced by a technique known as thread cutting. In thread cutting, a single, continuous groove is cut on the roll while the diamond tool is moved in a direction transverse to the turning roll. If the structures to be produced have a constant pitch, the tool will move at a constant velocity. A typical diamond turning machine will provide independent control of the depth that the tool penetrates the roll, the horizontal and vertical angles that the tool makes to the roll and the transverse velocity of the tool.

In the invention a fast tool servo (FTS) is used to superimpose a back and forth motion on the constant transverse motion of the diamond tool. It is also possible to use the FTS to move the diamond tool to different depths to provide varying heights for the prisms as taught in U.S. Pat. No. 6,354,709, the teaching of which is incorporated herein by reference.

What is claimed is:

1. A prismatic film intended for use in a backlight for a light gating device having an array of pixels wherein the prisms have a serpentine shape wherein the serpentine shape has an average amplitude and an average period and the pixels are composed of subpixels and the pixels and subpixels each have widths and the average amplitude is greater than or equal to about 25 percent of the width of a sub-pixel and the average period is greater than or equal to about the width of a pixel.

2. The prismatic film of claim 1 wherein the ratio of the average period to the average amplitude is less than or equal to about 12 to 1.

3. A backlit display comprising.
a backlight;
a light gating device having an array of pixels;
a film between the backlight and the light gating device, the film having prismatic structures on one side, the structures having serpentine shapes wherein the serpentine shape has an average amplitude and an average period and the pixels are composed of subpixels and the pixels and subpixels each have widths and the average amplitude is greater than or equal to about 25 percent of the width of a sub-pixel and the average period is greater than or equal to about the width of a pixel.

4. The prismatic film of claim 3 wherein the ratio of the average period to the average amplitude is less than or equal to about 12 to 1.

5. A backlit display comprising:
a backlight;
a light gating device having an array of pixels;
a first film between the backlight and the light gating device, the film having prismatic structures on one side, the structures having serpentine shapes; and
a second film between the backlight and the light gating device, the second film having prismatic structures on one side wherein the structures having serpentine shape and are on the same side of the film as the light gating device.

* * * * *

UNITED STATES PATENT AND TRADEMARK OFFICE
CERTIFICATE OF CORRECTION

PATENT NO. : 7,278,771 B2 Page 1 of 1
APPLICATION NO. : 10/994571
DATED : October 9, 2007
INVENTOR(S) : Alan B. Campbell It is certified that error appears in the above-identified patent and that said Letters Patent is hereby corrected as shown below:

<u>Title Page, item [57] Column 2 (Abstract)</u>
Line 1, delete "structure" and insert -- structures --, therefor.

<u>Column 3</u>
Line 55 (Approx.), delete "moire" and insert -- moiré --, therefor <u>Column 4</u>
Line 19, after "useful." delete "μm".
Line 41, delete "moirc" and insert -- moiré --, therefor.

<u>Column 5</u>
Line 25, in Claim 3, delete "comprising." and insert -- comprising: --, therefor.

Signed and Sealed this

Twenty-fifth Day of March, 2008

JON W. DUDAS
*Director of the United States Patent and Trademark Office*